United States Patent [19]
Parent

[11] 3,712,091
[45] Jan. 23, 1973

[54] METHOD AND DEVICE FOR HANDLING MOTOR VEHICLE KEYS

[76] Inventor: Ronald Joseph Parent, 25 Dundurn Crescent, Toronto, Ontario, Canada

[22] Filed: Jan. 4, 1971

[21] Appl. No.: 103,739

Related U.S. Application Data

[63] Continuation-in-part of Ser. No. 822,842, April 14, 1969, abandoned.

[30] Foreign Application Priority Data

April 8, 1970 Canada..................................079527

[52] U.S. Cl.......................................................70/63
[51] Int. Cl. .............................................E05b 65/48
[58] Field of Search ....70/63, 14, 181; 292/247, 288, 292/DIG. 2; 248/214, 215, 304; 211/87; 109/52, 23

[56] References Cited
UNITED STATES PATENTS

| | | | |
|---|---|---|---|
| 2,813,620 | 11/1957 | Hansen | 206/1 |
| 1,315,326 | 9/1919 | Palis | 248/115 |
| 2,500,881 | 3/1950 | Stader | 211/87 |
| 2,549,391 | 4/1951 | Secord | 211/87 |
| 2,755,748 | 7/1956 | Abell | 109/52 |
| 2,911,814 | 11/1959 | Williams | 70/14 |
| 3,236,075 | 2/1966 | Williams | 70/63 |

*Primary Examiner*—Robert L. Wolfe
*Attorney*—Westell & Hanley

[57] ABSTRACT

A method and device for handling the keys for a number of different automotive vehicles, in which the keys for each vehicle are placed in a compartment of an individual housing for that vehicle, the housing is engaged with an external bridging fixture of that vehicle, and the compartment is closed and locked simultaneously with the locking of the housing on the fixture, each housing and compartment being releasable by a key common to all the housings.

2 Claims, 5 Drawing Figures

PATENTED JAN 23 1973
3,712,091
SHEET 1 OF 2
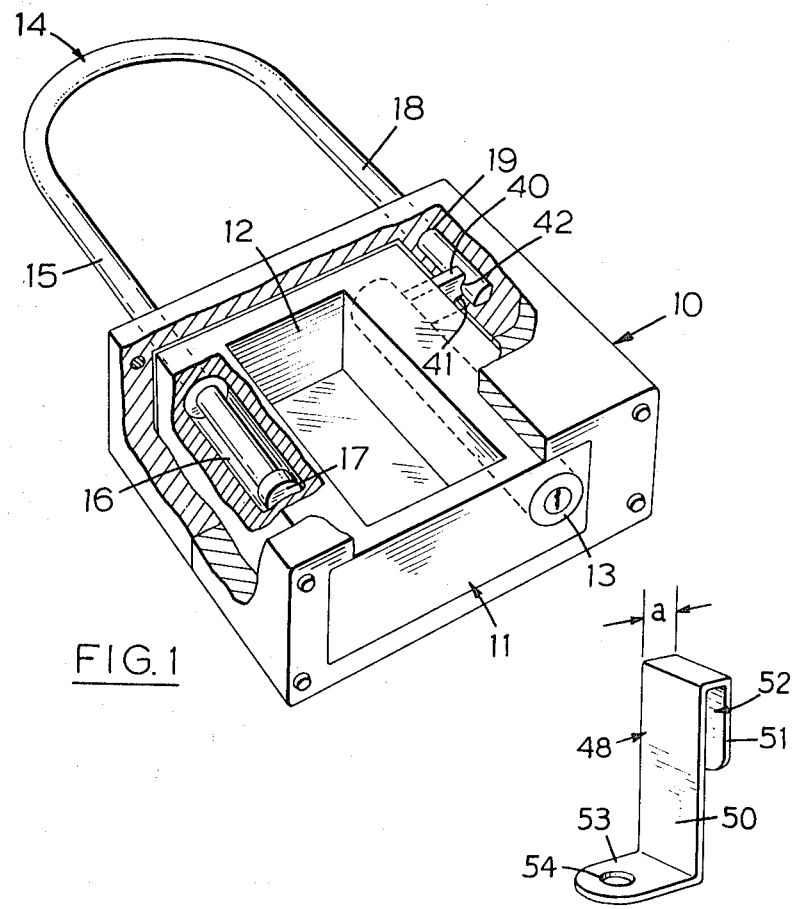
FIG.1
FIG.5
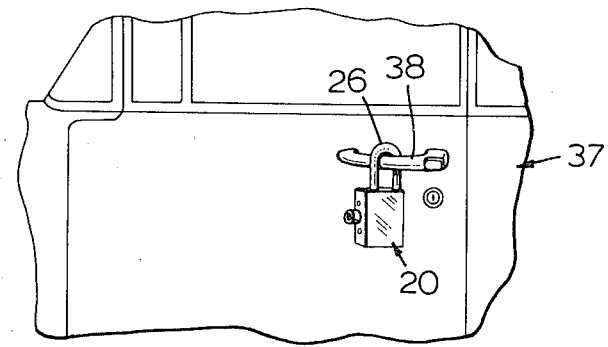
FIG.4
INVENTOR.
RONALD J. PARENT
BY Westell & Hanley

PATENTED JAN 23 1973

INVENTOR.
RONALD J. PARENT

BY *Westell & Hanley*

METHOD AND DEVICE FOR HANDLING MOTOR VEHICLE KEYS

This application is a continuation-in-part of my U.S. Pat. application No. 822,842 filed Apr. 14, 1969 and now abandoned.

The present invention relates to the handling of keys for motor vehicles.

It is presently the practice, in operating sales lots for automobiles or trucks, to collect all the keys of the automotive vehicles at the end of the day and keep them in a safe place, redistributing the keys the next day to the individual vehicles for ready use. This practice results in a great deal of expended effort, confusion and loss of keys.

It is an object of the invention to provide a method of releasably securing the keys for the locks of a number of automotive vehicles, each set of keys being locked to the vehicle with which the set of keys is associated.

Another object of the invention is to provide a simplified device for releasably securing a key or keys of an automotive vehicle to the door handle or other fixed bridge on that vehicle.

Example embodiments of the invention are shown in the accompanying drawings, in which:

FIG. 1 is a view in perspective, partly broken away, showing a device of the invention having a sliding compartment;

FIG. 4 is a fragmentary view of an automotive vehicle, showing the device of FIGS. 2 and 3 attached to a handle of the vehicle; and FIG. 5 is a perspective view of an auxiliary bridging fixture for the device of FIG. 1 or FIG. 2.

Figure 2:
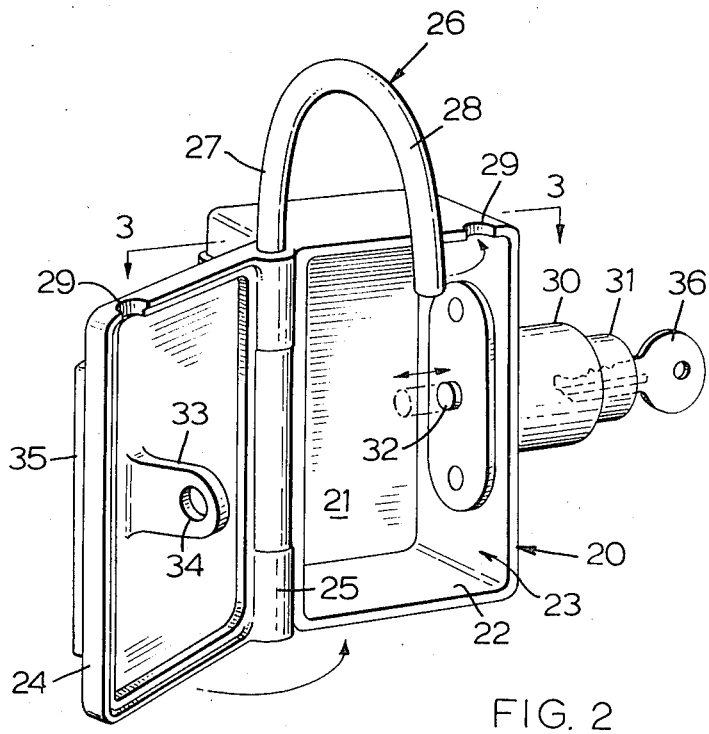
FIG. 2 is a view in perspective showing an alternate embodiment of a device of the invention, open to receive keys.

The locking device shown in the drawing consists of a housing 10 circumscribing a member 11 in the form of a drawer slidably mounted in the housing. Member 11 carries an open compartment 12 and a key actuated lock 13. A bail 14 is mounted with one leg 15 longitudinally both slidable and rotatable in a cavity 16 of member 11 and restrained therein by an end collar 17, while the other leg 18 of the bail is longitudinally slidable in a passage 19 in housing 10. A bolt 40 of lock 13 projects laterally into a recess 41 of housing 10 to engage the recess and a notch 42 in leg 18 of bail 14, thus simultaneously locking both member 11 and bail 14 in closed position. Bolt 40 is rectractable, by the action of a key in lock 13, to disengage from both notch 42 of bail 14 and from recess 41 of housing 10. When bolt 40 is retracted, bail 14 may be pulled outwardly from housing 10 and rotated about leg 15 while member 11 may be slid outwardly from the housing to give access to compartment 12. Legs 15 and 18 of bail 14 are of a length sufficient to allow adequate withdrawal of member 11 from housing 10.

In the operation of the device, lock 13 is actuated to retract bolt 40 and release both bail 14 and member 11, allowing both the bail and the member to be moved outwardly from housing 10. The keys of an automotive vehicle are placed in compartment 12 and member 11 is then slid back into housing 10 while bail 14 is rotated and engaged on a door handle of the vehicle. Finally, bail 14 is moved inwardly to engage leg 18 with passage 19 and, with member 11 in proper closed position in housing 10, bolt 40 is actuated by the key of lock 13 to engage recess 41 of the housing and notch 42 of bail 14. This locks the vehicle keys in compartment 12 and attaches the closed compartment to that vehicle.

It will be appreciated that leg 15 or leg 18 of bail 14 could engage either housing 10 or member 11; for instance leg 15 could be slidably mounted in cavity 16 in housing 10. Also, lock 13 could either be key actuated, or operated by a combination mechanism (i.e., a combination lock). Of course suitable steps could be fixed to housing 10 or member 11 preventing complete withdrawal of the member from the housing.

Figure 3:
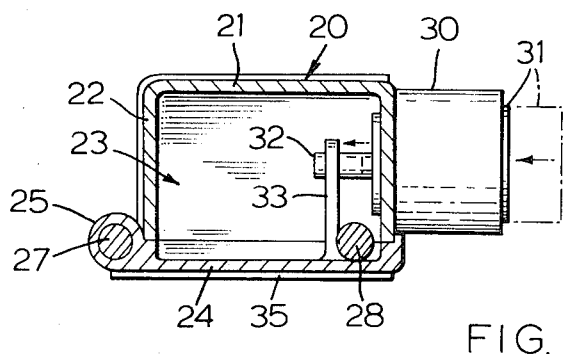
FIG. 3 is a view in cross-section taken along the line 3—3 of FIG. 2.

The alternate embodiment shown in FIGS. 2 and 3 of the drawings comprises a box 20 having a fixed bottom 21 and a circumscribing side wall 22 defining a compartment 23 for reception of keys. A lid or cover 24, pivotally attached on side wall 22 by a hinge 25, closes to seal cavity 23 from external access. A bail 26 has one leg 27 located in hinge 25 to act as a hinge pin and the other leg 28 engagable in an aperture formed by a pair of recesses 29, one recess in wall 22 and the other in cover 24, when the cover is closed on the wall to seal compartment 23. Wall 22 of box 20 carries an outwardly projecting annular barrel 30 in which a cylindrical lock 31 is mounted. A locking bolt 32 projects through an aperture in wall 22 into compartment 23 and is connected with lock cylinder 31 for longitudinal movement further into the compartment on movement of the lock into barrel 30. A lug 33, integral with cover 24, projects inwardly from the cover and aperture 34 in lug 33 is aligned with bolt 32 of lock cylinder 31 when cover 24 is in closed position and the lug projects into compartment 23. A band 35 of resilient material such as rubber is fixed on the outer surface of box 20 and cover 24.

In the operation of the device of FIGS. 2 and 3 of the drawings, a set of keys for a motor vehicle 37 is placed in compartment 23 of box 20 after the vehicle has been locked, and bail 26 is hooked over a door handle 38 of the vehicle, as seen in FIG. 4 of the drawings. Cover 24 is then closed as shown in FIG. 3, and lock cylinder 31 is pressed into barrel 30 which moves bolt 32 through aperture 34 in lug 33. When lock cylinder 31 is fully depressed it is locked in position and is retractable in the opposite direction, to disengage bolt 32 from lug 33 only when actuated by a key 36, whereupon cover 24 may be opened to withdraw the keys of the automobile resting in compartment 23.

Box 20 may be made of any strong material such as zinc. Resilient band 35 prevents the device from damaging the finish of the automotive vehicle to which it is attached.

The best example use of the system is with motor vehicles on a sales lot. The keys of each automobile or truck are placed in compartment 12 or 23 of the described devices after that vehicle has been locked and bail 14 or 26 is hooked over one of the door handles of the vehicle, after which the bail and member 11 or cover 24 are moved into closed position, whereupon lock 13 or 31 is actuated to lock the bail and member, at the same time locking the device onto the vehicle. Each vehicle has a separate device associated with it and the single key actuating all the devices is kept separately in a safe place. Of course the door handle of the vehicle must be of the type forming a bridge if it is to be used, i.e., both ends of the handle must be fixed to the door, in order to prevent the device from being disengaged from the handle while locked in position. If the door handle of the vehicle does not meet this requirement then another externally accessible bridging fixture on the vehicle may be used. If there is no suitable bridging fixture on the vehicle, an auxiliary bridging fixture 48 as shown in FIG. 5 may be used. Fixture 48 comprises a flat, rigid strip 50, preferably of metal bent back on itself at one end to form a hook 51 defining a slot 52 which is wide enough to accommodate a portion of the upper edge of a car window while the outer width *a* of the strip at the slot is narrow enough to be accommodated in the recess of the car door into which the upper edge portion of the car window slides when the window is raised to close it. The other end of strip 50 is angled outwardly on that side of the strip opposite hook 51 to form a flange 53 which carries an aperture 54 adapted to receive bail 14 or bail 26 of the devices shown in FIGS. 1 or 2 of the drawings. To use fixture 48, hook 51 is fitted over the upper edge of a car or truck window when opened and the window is then closed to carry the hook portion of the member into the recess of the door frame with the window edge, leaving flange 53 free to receive the device of the invention through aperture 54.

It will be appreciated that the system of the present invention, as outlined above, greatly facilitates the operation of enterprises where a number of vehicles, each having a separate lock or locks (in an automobile there are usually at least two keys to handle, the ignition and door key, and the trunk key, all being placed in a single locking device) must be controlled. Not only does the present system materially reduce the work in handling the keys, but also the keys are not able to be intermixed to cause confusion and there is less tendency to secrete the keys in the environs of the locks with the attendant danger resulting from this practice.

I claim:

1. A device for handling the keys for an automotive vehicle, comprising:

a housing having a compartment adapted to receive the keys of the vehicle, said housing having a bottom and circumscribing walls forming said compartment and a cover hinged to one wall;

a bail on the housing releasably engageable with an external bridging fixture on the vehicle, one leg of the bail acting as a pin for said hinge, the other leg of the bail terminating in the housing when the cover is closed on said compartment;

means adapted to lock the housing with the compartment inaccessible therein and simultaneously to lock the bail on the fixture; and means to unlock the bail and the housing.

2. A device as claimed in claim 1 in which the locking means comprises a barrel carrying a bolt movable, on depression of the barrel, into the compartment to engage an apertured lug projecting from the inner face of the cover, the barrel and bolt being releasable by key actuated means.

* * * * *